Feb. 15, 1966    M. M. HANN    3,234,726
ELECTRIC OVERRIDE FOR PUMP
Filed May 11, 1964    2 Sheets-Sheet 1

Inventor
Melvin M. Hann
By
Hofgren, Wegner,
Allen, Stellman, & McCord
Attys

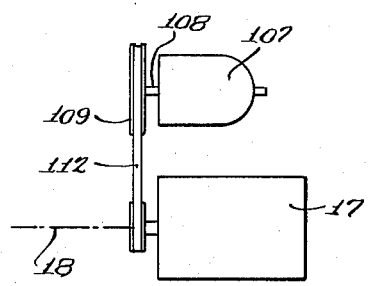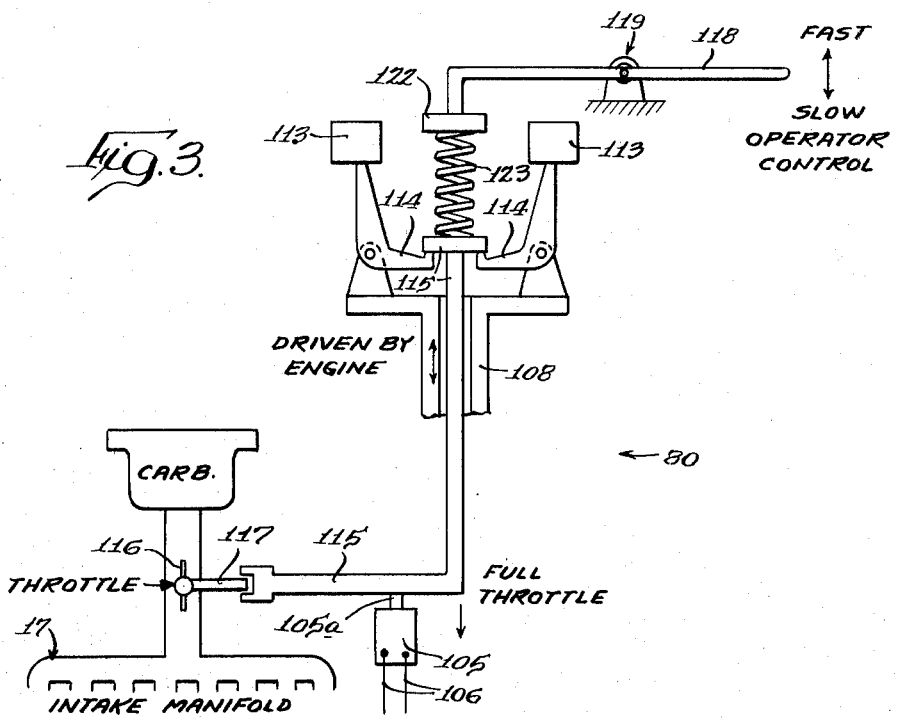

United States Patent Office 3,234,726
Patented Feb. 15, 1966

3,234,726
ELECTRIC OVERRIDE FOR PUMP
Melvin M. Hann, Rockford, Ill., assignor to Sundstrand Corporation, a corporation of Illinois
Filed May 11, 1964, Ser. No. 366,440
8 Claims. (Cl. 60—19)

This invention relates to a drive system including a hydrostatic transmission and control system therefor particularly suited for use in propelling a vehicle of the slow moving, hard working type, such as an industrial tractor or farm tractor, and the invention more particularly relates to the control of the transmission in a new and useful manner.

It is a general object of this invention to provide a new and useful control means for a transmission in a drive system of the type described.

A further object is to provide a new and useful control means for a hydrostatic transmission including means responsive to engine speeds for varying the transmission displacement, and especially the pump displacement, for preventing stalling of the engine in response to excess loads imposed on the transmission.

A more specific object is to provide a new and useful controlled hydrostatic transmission having a motor and variable displacement pump for driving the motor, the pump in turn being drivable by an engine, in which control of the pump displacement is responsive to an electric signal designating decrease in engine speed or transmission input speed below a predetermined level in such manner as to decrease pump displacement responsive to the signal to thereby reduce the load of the transmission on the engine while the engine speed is below the predetermined level.

Further objects and advantages will become apparent from the following detailed description taken in connection with the accompanying drawings, in which:

FIGURE 1 is a diagrammatic illustration of a drive system enveloping a hydrostatic transmission and control embodying this invention;

FIGURE 2 is a diagrammatic illustration of the drive for a governor system useful in accordance herewith; and FIGURE 3 illustrates a form of control means including a governor system driven as shown in FIGURE 2.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

In FIGURE 1, there is shown a hydrostatic transmission having a closed hydraulic circuit 12, pump 14 at one end thereof and a motor 16 at the other end. The pump is driven by a suitable prime mover in the form of engine 17 (FIGURES 2 and 3) through suitable connecting drive means diagrammatically illustrated at 18. Transmission output is provided in the form of an output shaft, diagrammatically illustrated at 19, for propelling a vehicle. Conduits 20 and 22 which carry the pumped fluid from the pump to the motor and return the same to the pump are included in the closed circuit 12.

The pump is of an axial piston type having a variable displacement swash plate 24 reversible in either direction from zero for changing the direction and speed of the vehicle by selectively positioning the swash plate. The motor is an axial piston fixed displacement motor having a stationary cam plate 26.

Two pump displacement control cylinders 28 and 30 are provided and linked with the pump swash plate by means of the rods 29 and 31 for positioning the swash plate in response to selective actuation of the cylinders. Each of the cylinders is provided with a centering spring 32 or 34, to normally position the pump swash plate in an upright minimum displacement position as shown in FIGURE 1. When fluid under pressure is admitted to one or the other of the two cylinders, then one of the rods will move to tilt the swash plate in one direction, causing the other rod to retract and push the piston on the end thereof in opposition to the centering spring.

A positive displacement gear type replenishing and cooling pump 44, driven by engine 17, e.g. by means shown diagrammatically at 18a, is positioned in the transmission and is in communication with a reservoir 46 by means of a conduit 48 for supplying replenishing and cooling fluid and control fluid to the system through a charge conduit 50.

Spring biased check valves 52 and 54 are provided in communication with each of the conduits 20 and 22 by means of conduits 53 and 55, respectively, for supplying replacement fluid to the low pressure side of the circuit from conduit 50. A make-up relief valve 56, which is also in communication with the charge conduit 50, is provided for removing the excess fluid pumped by the pump 44 when the transmission is in neutral. The excess fluid is then conducted as drain to reservoir 46 from make-up relief valve 56.

The transmission is further provided with two overpressure relief valves 57 and 58, a low pressure relief valve 59 and a shuttle valve 60. The overpressure relief valves 57 and 58 prevent abnormally high pressure in either of the two main hydraulic lines by relieving the circuit of surge pressures which may occur during acceleration or braking conditions. Conduits 61 and 62 communicate the fluid from either of the lines 20 or 22 to the valves 57 and 58, respectively, so that fluid from the higher pressure line will feed through the conduit 61 or 62 to appropriately move the overpressure relief valve to permit the high pressure fluid to flow directly to the other line through the other conduit.

The low pressure relief valve 59 removes replenishing and cooling fluid from the low pressure one of lines 20 and 22, depending on the disposition of valve 60, when the transmission is in a position other than neutral. For aiding the low pressure relief valve in performing its function, the shuttle valve 60 is in communication with the conduit 20 by means of conduits 63, 64, and the conduit 22 by means of conduits 65, 66. The fluid in the higher pressure one of conduits 63 and 65 will appropriately move the shuttle valve so that fluid from either the conduit 64 or 66 may pass through the valve and through conduit 67 to the low pressure relief valve 59. From there the high pressure fluid flows to drain through conduit 68, passing first through a heat exchanger 69 and a filter 70 before arriving at the reservoir 46.

For controlling the transmission displacement, i.e. the displacement of pump 14, a manually operable control handle 74 is provided. The control handle 74 is movable in forward and reverse directions from its center position as shown in FIGURE 1, as indicated by the arrows, which movement and degree of movement will correspond to the direction and speed of the transmission output manifested in shaft 19. The handle 74 is secured through a resilient link, in the form of a strong coil spring 76, to one end of a control rod or link 75 which serves to translate the movement of the handle in a manner to be described in detail later.

An override control means is shown generally at 78 and includes an override control valve 79 and an override governor means 80 with interconnecting signal transmission means therebetween. The valve 79 is in communication with pressure fluid in the charge conduit 50 by means of a conduit 81 and, when properly positioned, supplies control fluid by means of conduit 81a to a pump displacement control valve 82. From the control valve 82 fluid is supplied to one or the other of the pump control cylinders 28 and 30 by means of the conduits 83 or 84.

The pump control valve 82 is provided with a centering spring 85 which serves to normally position a valve stem 86 in a neutral position so that no fluid may be supplied through either conduit 83 or 84. In the neutral position, the lands 86a block communication of passage 81a with conduits 83 and 84 and communicate the latter respectively with drain ports 91 and 92. The valve stem 86 can be moved to either the left or the right, and is configured with appropriate lands 86a to supply control fluid from conduit 81a, conduit 83 or 84, respectively, and thence to the control cylinders 32 or 30, respectively. With valve stem 86 to the left in FIGURE 1, conduit 81a is connected to conduit 83 and conduit 84 is connected to drain through conduit 92. With valve stem 86 to the right in FIGURE 1, conduit 81a is connected to conduit 84, and conduit 83 is connected to drain through conduit 91. The extent to which the valve stem is moved determines the volume rate of flow of fluid supplied to the conduit 83 or 84 and to the appropriate pump control cylinder. As will be seen, the extent of movement of valve stem 86 also determines the extent to which the pump swash plate is tilted by the pump control cylinder rod.

For moving the valve stem 86, the pump control rod 75 is pivotally mounted to a translating link 87, as at 88. The link 87 is also pivotally secured at one end, at 89, to one end of the valve stem 86, and at the other end, at 90, to the pump swash plate 24. Plunger 29 is also pivotally connected at 90 to swash plate 24.

The valve stem 86 requires a very low force to be moved as compared to the force required to move the pump swash plate 24. Movement of the rod 75 displaces the stem 86 and causes the control link 87 to pivot about point 90. This permits fluid from the conduit 81 to flow through the pump control valve 82 to the proper pump control cylinder 28 or 30 to establish the desired swash plate angle for the desired direction and speed output of the transmission. As the swash plate moves in establishing the desired angle, the control link 87 pivots about its connection 88 to the control rod 75 resulting in return of the valve stem 86 back toward its central neutral position.

In order to return the transmission to neutral, to reduce transmission output speed, or to reverse the transmission output, handle 74 can be moved back toward neutral to drive stem 86 overcenter in the opposite direction to establish communication of the opposite ones of control cylinders 28 and 30 with line 81a and drain, respectively, resulting in movement of the swash plate 24 to a decreased displacement position or to or beyond neutral position, depending on the extent of movement of handle 74.

The coil spring 76, forming the resilient link between pivotally mounted handle 74 and control link or rod 75 is capable of compression or tension away from its normal configuration, which normally provides a rigid link between parts 74 and 75. The purpose of spring 76 is to prevent damage to valve 82. Handle 74 is pivotally mounted at 77 to suitable framework in the operator's compartment of the vehicle. The pivotal handle is frictionally or otherwise suitably retarded in a manner which maintains handle 74 in the pivotal disposition to which it is moved by the operator. The amount of swash plate displacement in pump 14 and the ratio of input to output speed of the transmission in a given direction are regulated or determined by the distance of the pivotal arc through which handle 74 is moved by the operator to attain the desired direction of drive, because the further valve stem 86 is moved in either direction, the greater is the resulting pivoting of the swash plate 24 before valve stem 86 is recentered. If handle 74 is moved in either direction sufficient to move valve stem 86 its complete extent of movement within valve 82, any movement of the handle thereafter will either compress or place tension on spring 76 protecting valve stem 86 from damage. As the displacement of swash plate 24 increases, link 87 will pivot about point 88 as described above to move valve stem 86 toward its central position. Thus, the greater the arc of movement of handle 74, the greater is the resulting increase in pump displacement. In the system shown, motor speed output manifested in shaft 19 varies with the displacement of pump 14, i.e., the angle of swash plate 24.

The override control valve 79 includes a valve stem 93 operatively associated with electric override means 80 for movement in response to an appropriate signal received therefrom. Stem 93 is movable between a drain position and a supply position (see FIGURE 1), respectively, for draining fluid from and supplying fluid to valve 82. A groove 94 in the valve 79 cooperates with a land 94a so that when the valve is in drain position, to the right of that shown in FIGURE 1, conduit 81a is in communication with a drain conduit 95 by way of the groove 94, removing control pressure from valve 82. When control pressure is thus removed from valve 82, all parts thereof communicate with tank, and swash plate 24 returns to neutral under urging of centering spring 32 or 34. If the valve stem 93 is moved to the left as shown in FIGURE 1 to its supply position, the land 94a blocks the flow of fluid from groove 94 to the drain conduit 95, and flow is permitted through valve 79 from conduit 81 to conduit 81a for supply of pressure fluid to valve 82. A second drain conduit 96 is positioned at the rear of the valve for draining leakage fluid and venting chamber 97.

The control valve 79 is solenoid operated, a winding 101 representing the solenoid coil which controls the valve stem 93. The valve stem 93 is normally maintained in its supply position by the urging of a compression spring 100. The winding 101 is connected by a wire 102 to a source of electrical power, such as a battery 103, and by wires 104 to a normally open limit switch 105 having an actuator 105a disposed for operation by a plunger in the governor means 80, in a manner described below. Wire 106 connects the battery 103 with the switch 105 completing electric circuitry for energizing winding 101 by switch 105.

As illustrated in FIGURE 2, the governor means 80 includes a governor 107 having a rotary input shaft 108 with a pulley as 109 connected thereto as by gearing, illustrated diagrammatically at 112, to be driven by the engine 17. Rotary input shaft 108 carries pivotally mounted flyweights 113 (FIGURE 3) normally in the position as illustrated when the shaft 108 is stationary. Upon rotation of the shaft 108, the flyweights 113 tend to swing outwardly so that flyweight arms 114 move upwardly as viewed in FIGURE 3 to actuate a plunger 115.

Plunger 115 is associated with a throttle 116 for the engine 17 in a manner to normally maintain the engine at a constant speed for a predetermined manually chosen setting. To this end, plunger 115 is suitably connected with a throttle arm 117 in a manner such that movement of the plunger 115 causes operations of the throttle 116. Plunger 115 is also associated with actuator 105a for operating limit switch 105.

A predetermined setting on the governor may be established by a manually or pedally accessible control as at 118 illustrated herein in the form of a lever or handle pivotally mounted in a suitable manner as at 119 and frictionally retarded by conventional means so that the handle normally stays in the position to which it may be placed by an operator. A plate or plunger 122 is secured to the end of lever or handle 118, facing plunger 115, to act on a compression spring 123 which acts on plunger 115.

In practice, the lever 118 is frequently referred to as a throttle control, but in operation it functions as a governor control for establishing a predetermined spring pressure on the governor plunger 115 which in turn controls the throttle 116.

In operation, the engine is normally started and the handle 118 is moved to a position establishing a predeterminated setting on the governor plunger 115. It will be understood that movement of the handle 118 to the position illustrated, which may be described as a fast position for the engine, increases the compression of the spring 123 so that the flyweights 113 are held in the position indicated and the throttle 116 is held in the position shown until the engine reaches the predetermined fast speed desired. Now, if the engine exceeds the predetermined value, the flyweights move outwardly, overcoming the spring 123, moving the plunger 115 upwardly and tending to decrease the throttle opening to decrease the engine speed. Conversely, if there is a drop in engine speed from some predetermined speed setting, flyweights 113 tend to move inwardly under the urging of spring 123 moving plunger 115 downwardly and tending to increase the throttle opening to increase the engine speed.

If, with the handle 118 set for a predetermined fast engine operation, the engine speed drops off and plunger 115 moves to increase the throttle opening, and the load on the engine is such that the engine cannot regain the speed which is called for, plunger 115 ultimately actuates the switch 105 upon engagement with actuator 105a, thereby to close the solenoid valve 79, by movement to the right, and the flow of fluid through line 81 is blocked and line 81a is connected to drain. Both of lines 83 and 84 are bled to drain over the valve lands, and springs 32 and 34 start to center the swash plate 24 to decrease pump displacement, resulting in reduced load on the engine so that it may recover its speed. Movement of the swash plate reopens valve 82, connecting both cylinders 30 and 32 to drain. Upon recovery of engine speed, switch 105 and valve 79 are reopened to again increase the displacement of pump swash plate 24, handle 74 having been retained in the position in which it was set. If the engine still cannot handle the load, i.e., if engine speed does not recover, the speed setting of handle 118 should be adjusted to a faster speed value sufficient to overcome the load.

While the specific illustrations herein relate to the provision of an electric control signal responsive to engine speed or input speed to the pump from the transmission, it will be understood that electric signals indicative of load conditions on the engine might be obtained from other sources for controlling the transmission in similar fashion.

I claim:
1. In a hydrostatic transmission including a motor having a transmission output, a variable displacement pump having a transmission input drivable by a prime mover and in fluid connection with said motor for driving said motor, and selectively operable means movable through a range for varying pump displacement to produce a selected transmission output speed within an output speed range, the improvement which comprises electric control means responsive to a decrease in transmission input speed to a predetermined speed level for overriding said selectively operable means, for reducing the pump displacement to reduce the load of the transmission on the transmission input an amount sufficient to reattain said transmission input speed level and for thereafter increasing pump displacement for bringing the transmission output speed to said selected transmission output speed.

2. In a controlled hydrostatic transmission system, a motor, a variable displacement pump, an engine for driving said pump, fluid conduit means connecting the pump and motor for driving the motor by the pump, rotary governor means drivable by the engine and sensing engine speed, fluid operable means for varying displacement of the pump, valve means for controlling the fluid operable means to vary the pump displacement, means controlled by the governor means for generating an electrical signal responsive to decrease in engine speed to a predetermined level and means responsive to the generated electric signal for overriding said valve means for decreasing displacement of said pump until the engine speed increases above said level, said governor means controlling said signal generating means to cancel the electric signal and deactuate said overriding means upon increase of engine speed above said level.

3. A drive system comprising a hydraulic motor, a variable displacement hydraulic pump, conduit means connecting pump outlet and motor inlet so that the pump delivers fluid to drive the motor, an engine connected for driving the pump, rotary governor means driven by the engine, fluid operable means for varying the displacement of the pump, manually controllable valve means for controlling the fluid operable means to vary pump displacement, override means controlling the fluid operable means for preventing increase in pump displacement, means associated with said governor means for generating an electric signal responsive to decrease in engine speed to a predetermined value resulting from load on the engine, and electrically responsive means for actuating said override means to decrease the load of the transmission on the engine by decreasing pump displacement responsive to an electric signal from said signal generating means.

4. In a drive system including a hydrostatic transmission and an engine in driving association with the transmission wherein an increase in load on transmission output results in decrease in engine speed, said hydrostatic transmission including a hydraulic motor with an output corresponding to the transmission output and a variable displacement hydraulic pump having its input driven by said engine and having its fluid output connected to the motor input for driving said motor, separate hydraulically responsive means for varying displacement of said pump in two directions from a minimum displacement position, a source of hydraulic fluid under pressure, manually operable valve means selectively movable between separate positions for controlling flow of fluid between said source and different respective ones of said separate displacement varying means for controlling said displacement varying means in opposite directions from minimum displacement position, electrical signal generator means, governor means driven by said engine and adapted to actuate said signal generator means to generate a signal responsive to decrease in engine speed below a predetermined level, and second valve means responsive to an electric signal from said signal generator means for (1) preventing flow of hydraulic fluid from said source to said manually operable valve means thereby overriding said manually operable means, and for (2) controlling said displacement varying means to decrease attained pump displacement.

5. In a hydrostatic transmission, a pump, a motor, conduit means connecting the pump to deliver fluid under pressure to the motor and connecting the motor to return fluid to the pump, an engine for driving the pump, means for varying the displacement of the pump to vary the transmission output, manually operable means controlling the displacement varying means for selectively varying displacement, and an override control including means for producing an electric signal in response to an increased load on the engine, and means responssive to the electric signal for reducing pump displacement to reduce the load on the engine.

6. A hydrostatic transmission, comprising a pump, a motor, conduit means connecting the pump to drive the motor, an engine for driving the pump, fluid operable means for varying the displacement of the pump to vary the transmission output, valve means connected to selectively port fluid relative to said fluid operable means, a manual control handle connected to said valve means to position the valve in accordance with the extent of movement of said handle, an override control including means for producing a signal in response to an increased load on the engine, and means responsive to said signal for porting fluid relative to said fluid operable means for reducing pump displacement to reduce the load on the engine, means for supplying control fluid to said valve means, said valve means being movable to one position in which control fluid is ported to said fluid operable means and movable to another position wherein fluid flow to and from said fluid operable means is blocked, and feedback means for maintaining the desired pump displacement including linkage means interconnecting said fluid operable means, said control handle means, and said valve means, said linkage means being effective to return said valve means to the other position when the displacement is reached in accordance with the position of said manual control handle.

7. A hydrostatic transmission, comprising a pump, a motor, conduit means connecting the pump to drive the motor, an engine for driving the pump, fluid operable means for varying the displacement of the pump to vary the transmission output, valve means connected to selectively port fluid relative to said fluid operable means, a manual control handle connected to said valve means to position the valve in accordance with the extent of movement of said handle, an override control including means for producing a signal in response to an increased load on the engine, and means responsive to said signal for porting fluid relative to said fluid operable means for reducing pump displacement to reduce the load on the engine, a charge pump connected to supply control fluid to said valve means, said override control including an override control valve connected between said charge pump and said valve means to selectively port said valve control fluid supply means to said valve means or to drain, said override valve being responsive to said signal for porting said supply means to drain for reducing the pump displacement.

8. A hydrostatic transmission, comprising a pump, a motor, conduit means connecting the pump to drive the motor, an engine for driving the pump, fluid operable means for varying the displacement of the pump to vary the transmission output, valve means connected to selectively port fluid relative to said fluid operable means, a manual control handle connected to said valve means to position the valve in accordance with the extent of movement of said handle, an override control including rotary governor driven by said engine, means responsive to said governor for producing a signal indicating an increased load on the engine, and means responsive to said signal for porting fluid relative to said fluid operable means for reducing pump displacement to reduce the load on the engine, said fluid operable means including separate hydraulic cylinder means for varying the displacement of said pump in two directions for minimum displacement position, resilient means for continuously biasing each of said cylinder means towards minimum displacement position, said valve means being selectively movable from a neutral position in either direction to port control fluid to and from said cylinder means for controlling said displacement varying means in opposite directions from minimum displacement position, said control handle means being movable in opposite directions from a neutral position, said resilient means for said cylinder means being operative to return said fluid operable means to a minimum displacement position upon movement of said control handle means to the neutral position, said rotary governor means including spring means for adjusting said governor to preselect a predetermined engine speed and to preselect an override speed, a predetermined value below said predetermined engine speed, at which the override governor reduces the pump displacement.

References Cited by the Examiner

UNITED STATES PATENTS

| | | | |
|---|---|---|---|
| 2,393,882 | 1/1946 | Blair | 60—19 |
| 3,065,700 | 11/1962 | Blenkle | 60—52 |

EDGAR W. GEOGHEGAN, *Primary Examiner.*